United States Patent
Lomax et al.

(10) Patent No.: US 10,020,477 B2
(45) Date of Patent: Jul. 10, 2018

(54) BATTERY ENCLOSURE VENT ASSEMBLY AND VENTING METHOD

(71) Applicant: Ford Global Technologies, LLC, Dearborn, MI (US)

(72) Inventors: Olivia Lomax, Southfield, MI (US); Patrick Daniel Maguire, Ann Arbor, MI (US); Stephen Liptak, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 15/340,902

(22) Filed: Nov. 1, 2016

(65) Prior Publication Data

US 2018/0123104 A1    May 3, 2018

(51) Int. Cl.
H01M 2/12 (2006.01)
(52) U.S. Cl.
CPC ...... H01M 2/1241 (2013.01); H01M 2220/20 (2013.01)
(58) Field of Classification Search
CPC ........................ H01M 2/1241; H01M 2220/20
See application file for complete search history.

(56) References Cited

U.S. PATENT DOCUMENTS

| 3,544,383 | A | 12/1970 | Oltman |
| 7,074,516 | B2 | 7/2006 | Davidson et al. |
| 8,945,740 | B2 | 2/2015 | Fuhr et al. |
| 2007/0009785 | A1 | 1/2007 | Kozuki et al. |
| 2009/0162737 | A1* | 6/2009 | Lai ............... H01M 10/615 429/56 |
| 2009/0311583 | A1* | 12/2009 | Wu ............... H01M 2/0413 429/82 |
| 2010/0209746 | A1 | 8/2010 | Kiyama |
| 2012/0040215 | A1* | 2/2012 | Zhu ............... H01M 2/1241 429/56 |
| 2013/0095353 | A1* | 4/2013 | Li ............... H01M 2/1276 429/54 |

(Continued)

FOREIGN PATENT DOCUMENTS

JP    8945740    3/2016
KR    100904374    6/2009

OTHER PUBLICATIONS

P.G. Balakrishnan, R. Ramesh, T. Prem Kumar, Safety mechanisms in lithium-ion Batteries, Journal of Power Sources, Feb. 28, 2006, pp. 401-414, vol. 155, Elsevier B.V.

*Primary Examiner* — Stewart A Fraser
(74) *Attorney, Agent, or Firm* — Carlson, Gaskey & Olds, P.C.

(57) ABSTRACT

An exemplary assembly includes an enclosure wall of an enclosure that houses at least one battery cell, and a vent of the enclosure wall. The vent is configured to move from a first position to a second position in response to an increase in a pressure within an interior of the enclosure. The vent in the second position provides a passage to discharge battery vent byproducts from the interior. An exemplary battery pack venting method includes moving a vent of an enclosure wall from a first position to a second position in response to an increase in a pressure within an interior of an enclosure having the enclosure wall. The vent in the second position provides a passage to discharge battery vent byproducts from the interior.

20 Claims, 6 Drawing Sheets

(56) References Cited

U.S. PATENT DOCUMENTS

2015/0318525 A1    11/2015  Maguire et al.
2015/0364735 A1*  12/2015  Kohira ................. H01M 4/525
                                                                                      429/55
2016/0226040 A1     8/2016  Mongeau et al.

\* cited by examiner

BATTERY ENCLOSURE VENT ASSEMBLY AND VENTING METHOD

TECHNICAL FIELD

This disclosure relates generally to an enclosure for a traction battery of an electrified vehicle and, more particularly, to an enclosure vent that provides a path for discharging battery cell vent byproducts during battery cell venting events.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack is a high-voltage battery pack that selectively powers the electric machines and other electrical loads of the electrified vehicle. The battery pack includes a plurality of interconnected battery cells that store energy for powering these electrical loads. The battery cells can be held within a battery enclosure. Under certain conditions, battery vent byproducts are expelled from the battery cells. The battery vent byproducts may need to be purged from the battery enclosure.

SUMMARY

A battery assembly according to an exemplary aspect of the present disclosure includes, among other things, an enclosure wall of an enclosure that houses at least one battery cell, and a vent of the enclosure wall. The vent is configured to move from a first position to a second position in response to an increase in a pressure within an interior of the enclosure. The vent in the second position provides a passage to discharge battery vent byproducts from the interior.

In a further non-limiting embodiment of the foregoing assembly, the vent and the enclosure wall together provide a monolithic structure.

In a further non-limiting embodiment of any of the foregoing assemblies, an area of the enclosure wall directly adjacent to the vent has a first thickness, and the vent has a second thickness that is less than the first thickness.

In a further non-limiting embodiment of any of the foregoing assemblies, the assembly includes the enclosure having a lid and a tray. The lid includes the enclosure wall with the vent.

In a further non-limiting embodiment of any of the foregoing assemblies, a portion of the vent protrudes into the interior past an area of the enclosure wall directly adjacent the vent when the vent is in the first position. The portion is moved outward away from the interior when the vent is in the second position.

In a further non-limiting embodiment of any of the foregoing assemblies, the enclosure wall and the vent are integrally formed together.

In a further non-limiting embodiment of any of the foregoing assemblies, the assembly includes a piercer outside the interior. Movement of the vent from the first position to the second position causes the piercer to rupture the vent to provide the passage.

In a further non-limiting embodiment of any of the foregoing assemblies, the vent includes a thermoplastic, and the piercer includes a metal or a metal alloy.

In a further non-limiting embodiment of any of the foregoing assemblies, the assembly includes an anchor securing a portion of the enclosure wall directly adjacent the vent to another structure separate from the enclosure wall. The anchor secures the portion when the vent is in the first position and when the vent is in the second position.

In a further non-limiting embodiment of any of the foregoing assemblies, the anchor is a molded-in anchor directed toward the interior.

In a further non-limiting embodiment of any of the foregoing assemblies, the anchor is configured to be engaged by a receiving feature housed within the interior.

In a further non-limiting embodiment of any of the foregoing assemblies, the assembly includes a score line of the vent. Movement of the vent from the first position to the second position causes the vent to rupture at the score line to provide the passage.

A battery pack venting method according to another exemplary aspect of the present disclosure includes, among other things, moving a vent that is formed with an enclosure wall from a first position to a second position in response to an increase in a pressure within an interior of an enclosure having the enclosure wall. The vent in the second position provides a passage to discharge battery vent byproducts from the interior.

In a further non-limiting embodiment of the foregoing method, the vent is formed as a single, monolithic structure together with the remaining portions of the enclosure wall.

In a further non-limiting embodiment of any of the foregoing methods, the moving comprises moving a portion of the vent extending into the interior outward away from the interior.

In a further non-limiting embodiment of any of the foregoing methods, the method includes rupturing the vent with a piercer as the vent moves from the first position to the second position. The piercer is located outside the interior.

In a further non-limiting embodiment of any of the foregoing methods, the method includes anchoring a portion of the vent such that movement of the vent from the first position to the second position causes the vent to rupture.

In a further non-limiting embodiment of any of the foregoing methods, the anchoring comprising engaging an anchor of the enclosure wall with a receiving feature within the interior.

In a further non-limiting embodiment of any of the foregoing methods, the method includes rupturing the vent at a score line when moving the vent from the first position to the second position to provide the passage.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A battery pack of an electrified vehicle can include an enclosure housing a plurality of battery cells. Occasionally, the battery cells may release battery vent byproducts, which increases the pressure within the enclosure. This disclosure is directed toward a vent that permits the battery vent byproducts to exit the enclosure.

The vent is formed together with a portion of the enclosure. The vent is normally sealed to the external environment. In response to the increase in pressure within the enclosure, the vent provides a passage. The battery vent byproducts can move through the passage to an area outside the enclosure. These and other features are discussed in greater detail in the following paragraphs of this detailed description.

Figure 1:
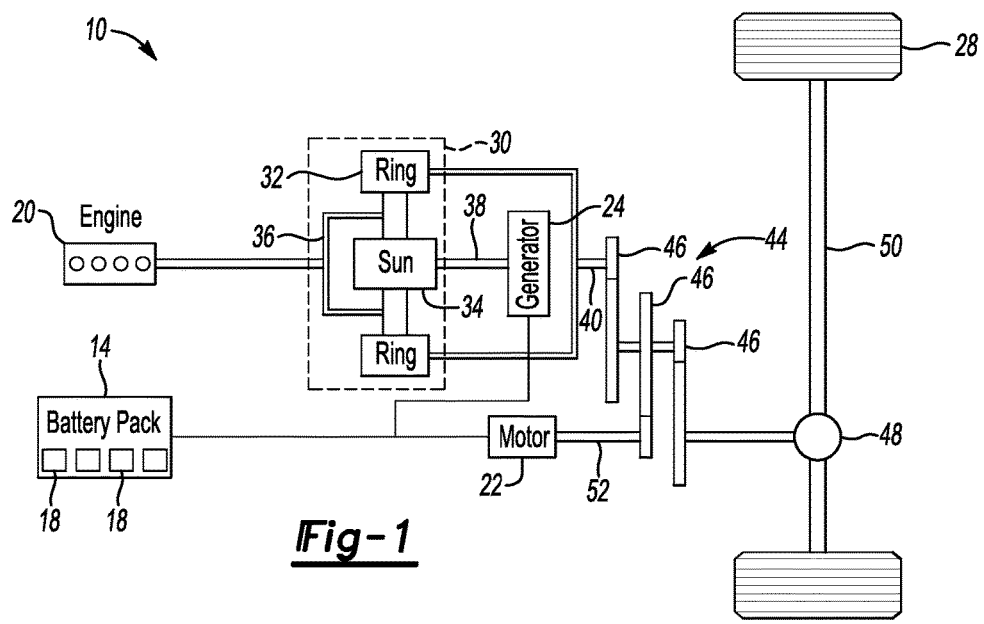
FIG. 1 schematically illustrates an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
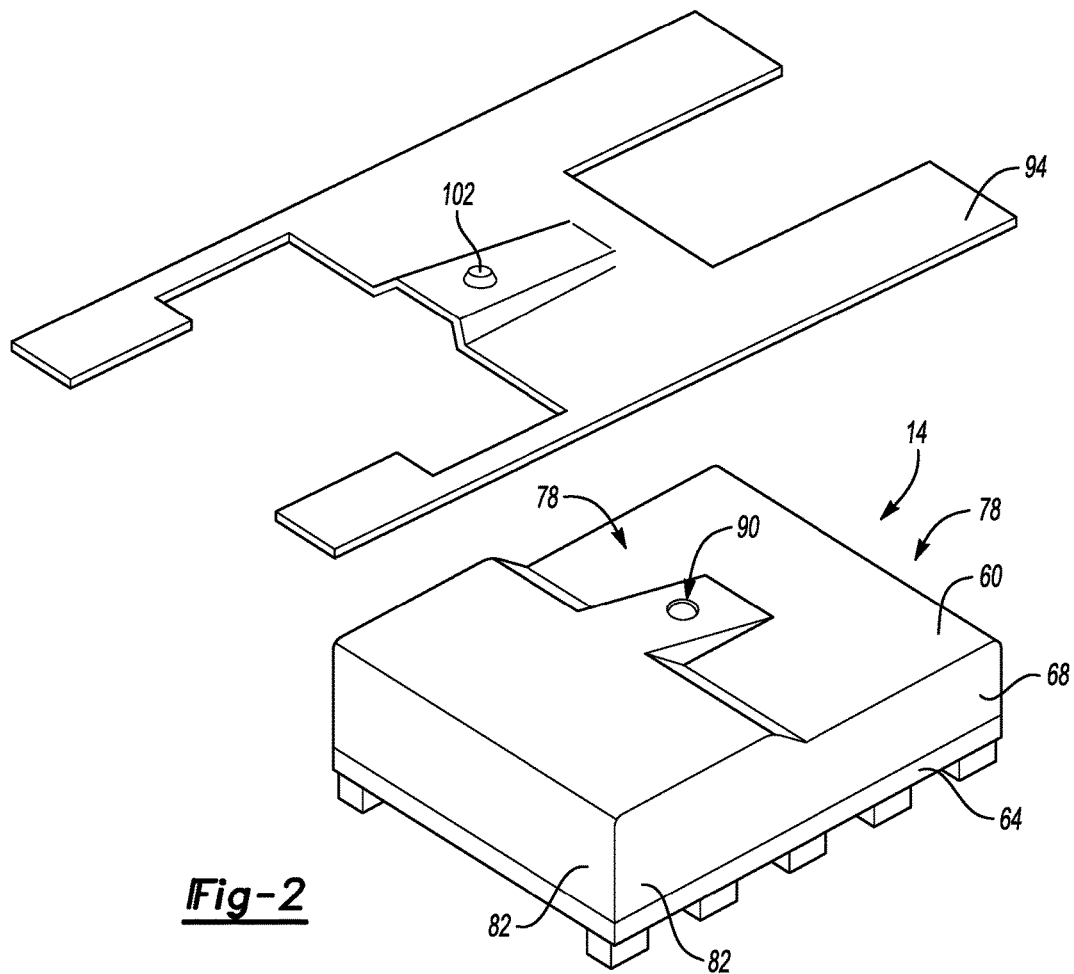
FIG. 2 illustrates the battery pack of FIG. 1 and a portion of a vehicle frame for securing the battery pack within the electrified vehicle.
Figure 3:
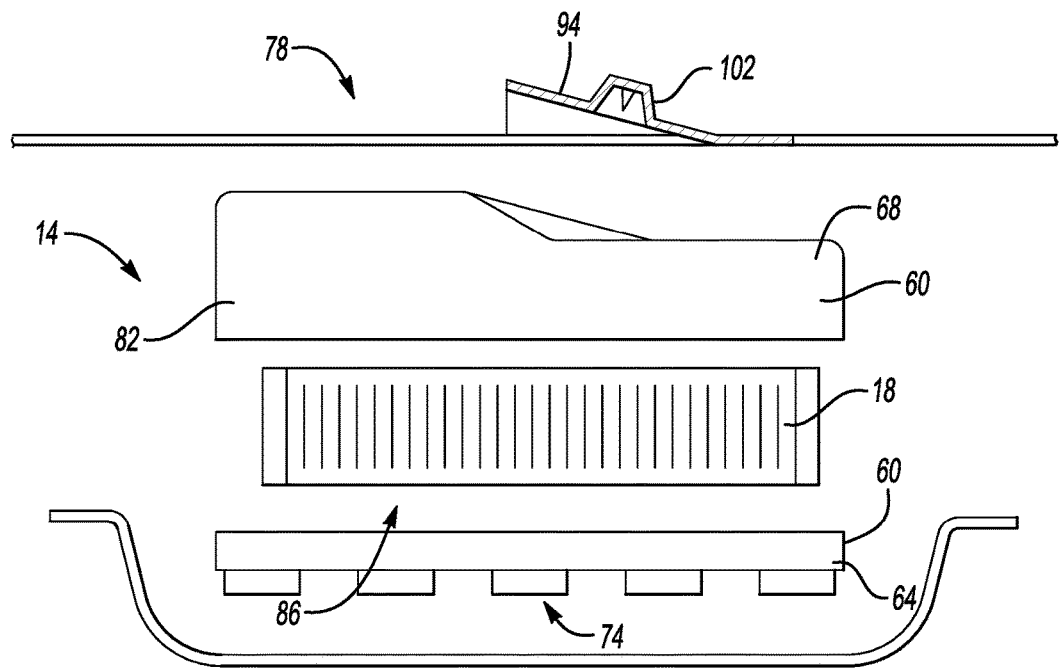
FIG. 3 illustrates an expanded side view of the battery pack and vehicle frame of FIG. 2.
Figure 4:
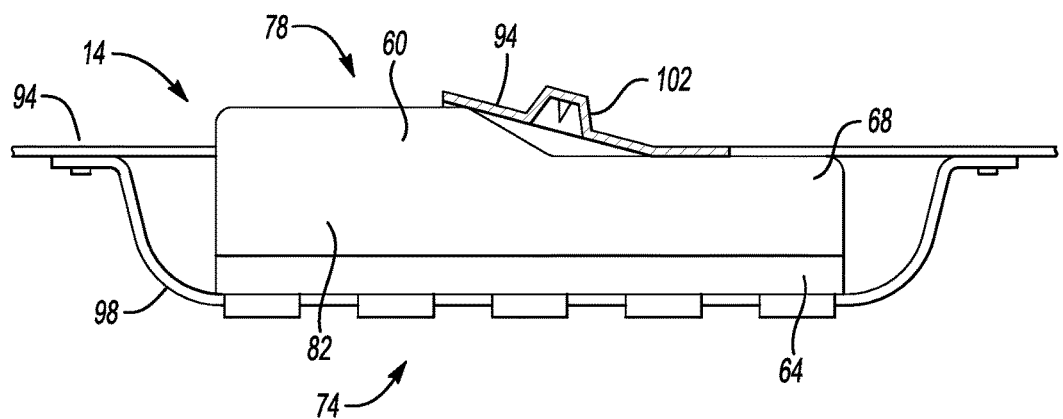
FIG. 4 illustrates a side view of the battery pack secured to the vehicle frame of FIG. 2.

Referring now to FIGS. 2-4 with continuing reference to FIG. 1, the battery pack 14 of the powertrain 10 includes the plurality of battery arrays 18 within an enclosure 60.

The enclosure 60 includes a tray 64 and a lid 68. Generally, the tray 64 provides a bottom enclosure wall 74, and the lid 68 provides a top enclosure wall 78. The lid 68 further includes a plurality of enclosure sidewalls 82 extending from the top enclosure wall 78 to the tray 64. In some examples, the sidewalls 82 are separate from the top enclosure wall 78 and the tray 64. In other examples, the sidewalls 82 extend directly from the top enclosure 78 or from the bottom enclosure wall 74 of the tray 64. In still other examples, the sidewalls 82 include a portion extending from the top enclosure wall 78 and another portion extending from the bottom enclosure wall 74 to meet somewhere between the top enclosure wall 78 and the bottom enclosure wall 74. An interior 86 provided between the tray 64 and the lid 68 holds the battery arrays 18.

The enclosure 60 is a polymer-based thermoplastic in this example. Exemplary thermoplastics suitable for the enclosure 60 include, but are not limited to, polypropylene and high density polyethylene. Infrared welding, a vibration welding, adhesive bonding or another adhering process can hermetically seal the lid 68 to the tray 64 to secure the lid 68 to the tray 64.

Under certain conditions, battery vent byproducts are expelled from battery cells within the battery arrays 18. This increases a pressure within the interior 86. Too much pressure within the interior 86 can disrupt the hermetic seal between the lid 68 and the tray 64. Too much pressure within the interior 86 can deform the external geometry/size of the enclosure 60 in undesirable ways (bulging too close to the ground for instance), and in extreme cases may cause the enclosure 60 to burst open in an uncontrolled location and/or manner.

To relieve pressure within the interior 86 and avoid such a disruption, the enclosure 60 incorporates a vent 90. Typically, the vent 90 is in a first, non-venting position that provides no passage for flow between the interior 86 and the surrounding environment. The vent 90 in this position prevents moisture and contaminates from entering the interior 86. In response to a pressure increase within the interior 86, such as when the battery cells expel battery vent byproducts, the vent 90 can move to a second, venting position where the vent 90 includes a passage for flow to move from the interior 86 to the surrounding environment outside the enclosure 60.

The vent 90 is part of the top enclosure wall 78. In other examples, the vent 90 is incorporated into one of the enclosure sidewalls 82, or the bottom enclosure wall 74. That is, the vent 90 is not limited to being positioned within the top enclosure wall 78.

The vent 90 is formed with the top enclosure wall 78. Thus, the battery pack 14 includes no separate structure other than the top enclosure wall 78 are required to provide the vent 90 within the top enclosure wall 78. Forming the vent 90 with the top enclosure wall 78 can reduce part complexity and provide a simpler assembly than if a separate vent were incorporated into the top enclosure wall 78. The vent 90 and the top enclosure wall 78 are together a single, monolithic structure.

Notably, the geometry of the vent 90 is such that movements of molding tools along a single axis can form and release the vent 90. Thus, no additional lifters or extensive tooling modifications are required to form the vent 90 with the top enclosure wall 78.

In this example, the vent 90 is molded together with the lid 68, and is integrally formed with the lid 68. Utilizing the vent 90 to provide a passage through the enclosure 60 can prevent an increase in pressure from disrupting the connection between the lid 68 and the tray 64.

The battery pack 14 can be secured to a vehicle frame 94 of the electrified vehicle. In this example, the vehicle frame 94 is an underbody mounting bracket on an underbody of the electrified vehicle.

Opposing ends of a strap 98 are secured to the vehicle frame 94 and extend below the tray 64 to support battery pack 14 against the vehicle frame 94. When the strap 98 is secured, the battery pack 14 is compressed between a portion of the vehicle frame 94 and the strap 98.

Referring now to FIGS. 5-8 with continuing reference to FIGS. 2-3, examples of the vent 90 in the first and the second position are shown. In the first position shown in FIGS. 5 and 6, an outermost portion 92 of the vent 90 does not extend proud of the surrounding surfaces of the enclosure 60. This can protect the vent 90 from inadvertent abrasion or damage during handling and installation.

Figure 7:
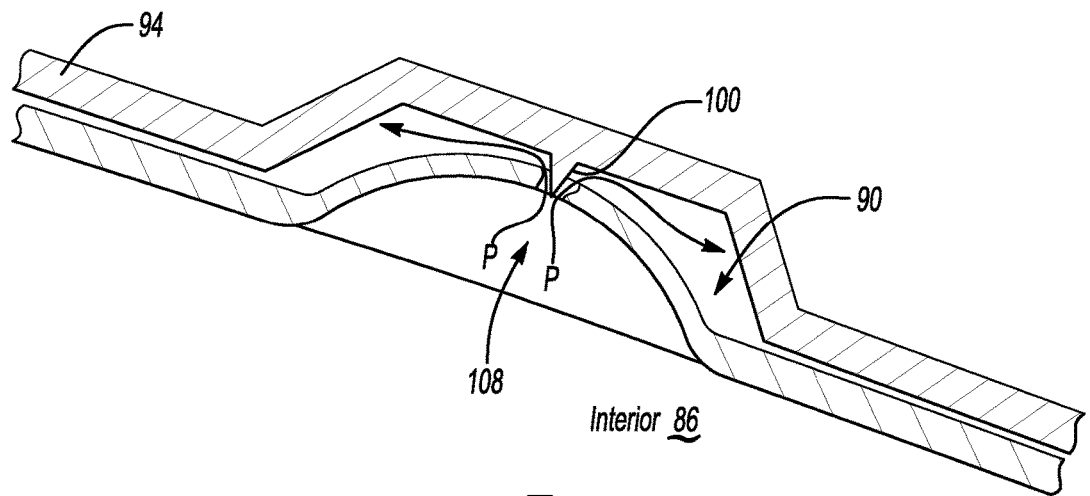
FIG. 7 illustrates a section view of the vent and vehicle frame of FIG. 5 with the vent in a second, venting position where the vent provides a passage to discharge battery vent byproducts.
Figure 8:
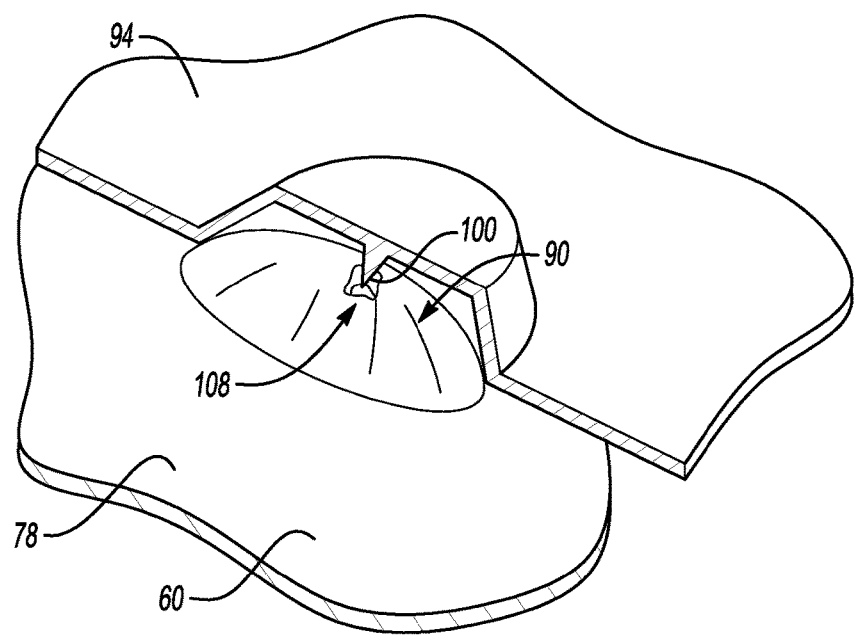
FIG. 8 illustrates perspective view of the vent in the position of FIG. 5 and the area of the vehicle frame.
Figure 9:
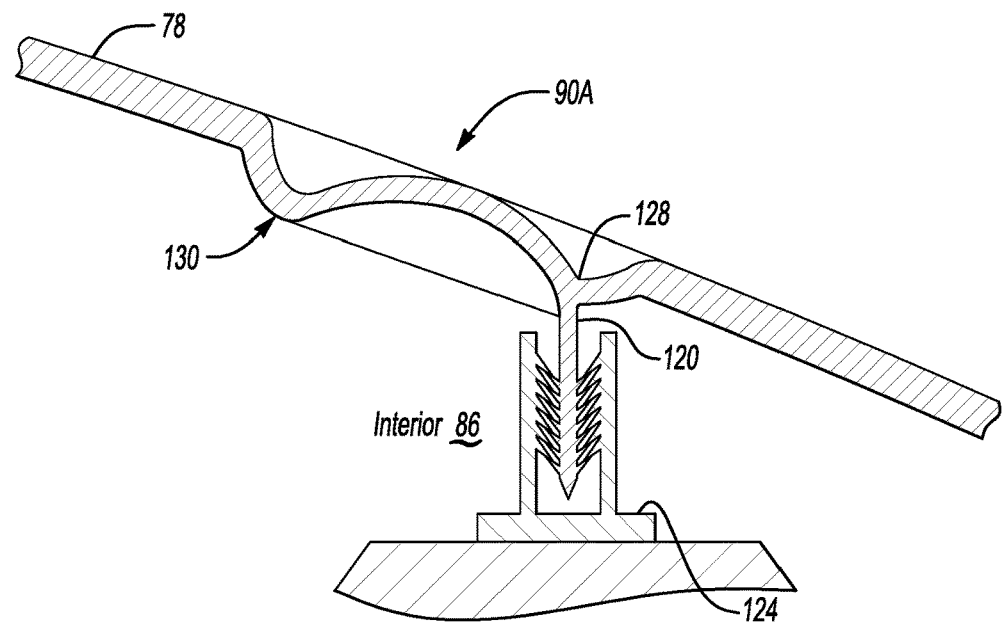
FIG. 9 illustrates a section view of a vent of the battery pack in a first, non-venting position and an area of the vehicle frame according to a second embodiment of this disclosure.
Figure 10:
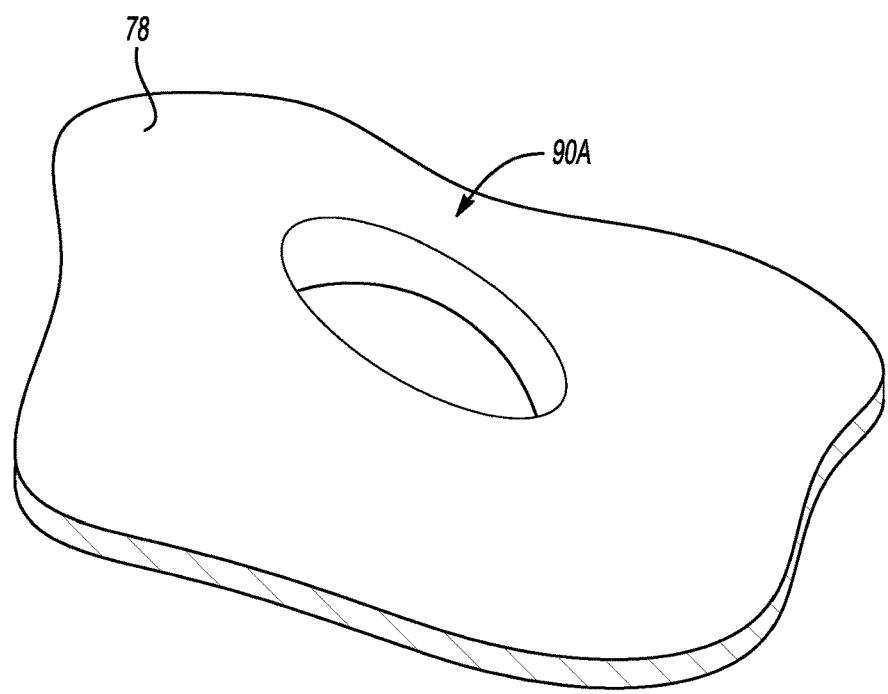
FIG. 10 illustrates a perspective view of the vent in the position of FIG. 9 and the area of the vehicle frame.
Figure 11:
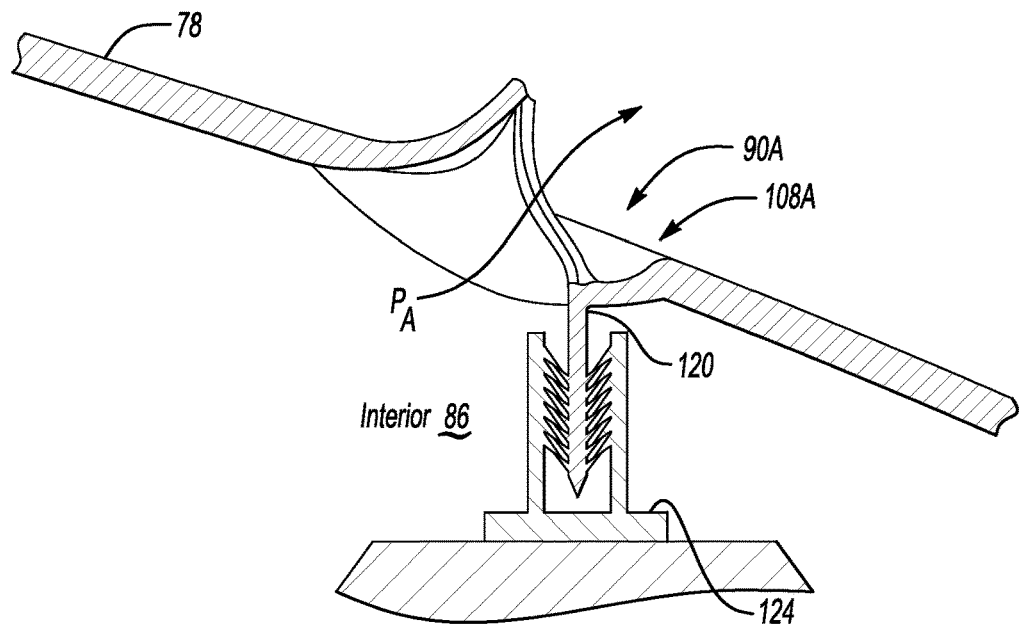
FIG. 11 illustrates a section view of the vent and vehicle frame of FIG. 9 with the vent in a second, venting position where the vent provides a passage to discharge battery vent byproducts.
Figure 12:
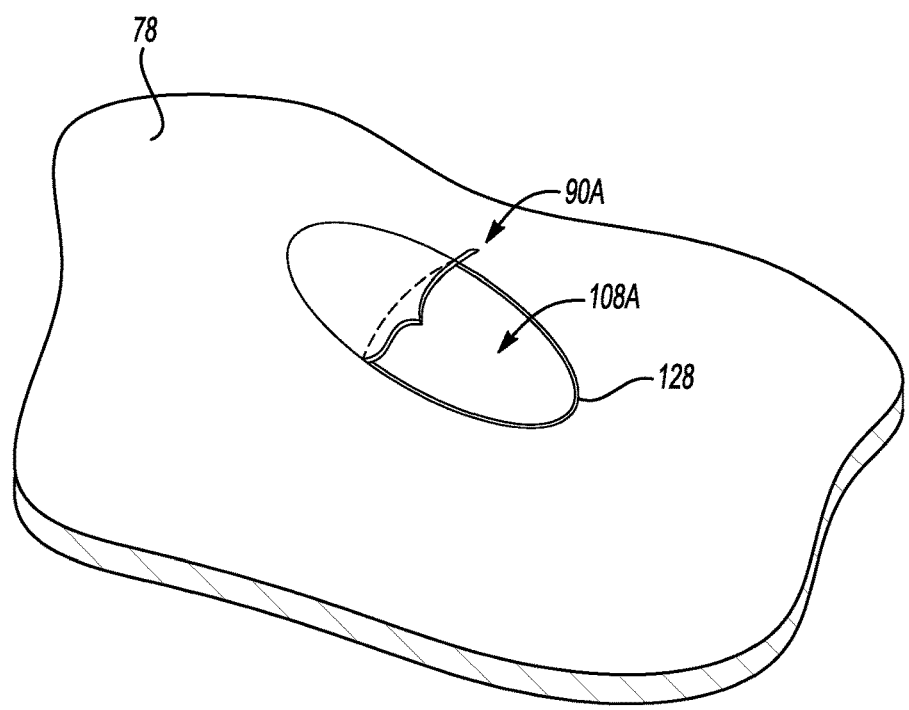
FIG. 12 illustrates perspective view of the vent in the position of FIG. 9 and the area of the vehicle frame.

An example of the vent 90 in the second position is shown in FIGS. 7 and 8. In this exemplary non-limiting embodiment, a piercer 100 extends from the vehicle frame 94. Although not required, the piercer 100 can be used to initiate rupturing the vent 90 as the vent 90 is moved to the second position. The exemplary piercer 100 is a metal or metal alloy material, but other rigid and sharp materials could be used, such as composites or polymers. The exemplary piercer 100 is made of the same material as the vehicle frame 94.

The example piercer 100 is held within a recessed area 102 of the vehicle frame 94 such that the piercer 100 does not extend proud of the vehicle frame 94 toward the battery pack 14. Recessing the piercer 100 within the recessed area 102 can protect against any inadvertent contact between the vent 90 and the piercer 100 by vibration or whole scale movement of the battery pack 14, the vehicle frame 94, or both, until the vent 90 moves toward the second position as a result of over pressure.

Figure 5:
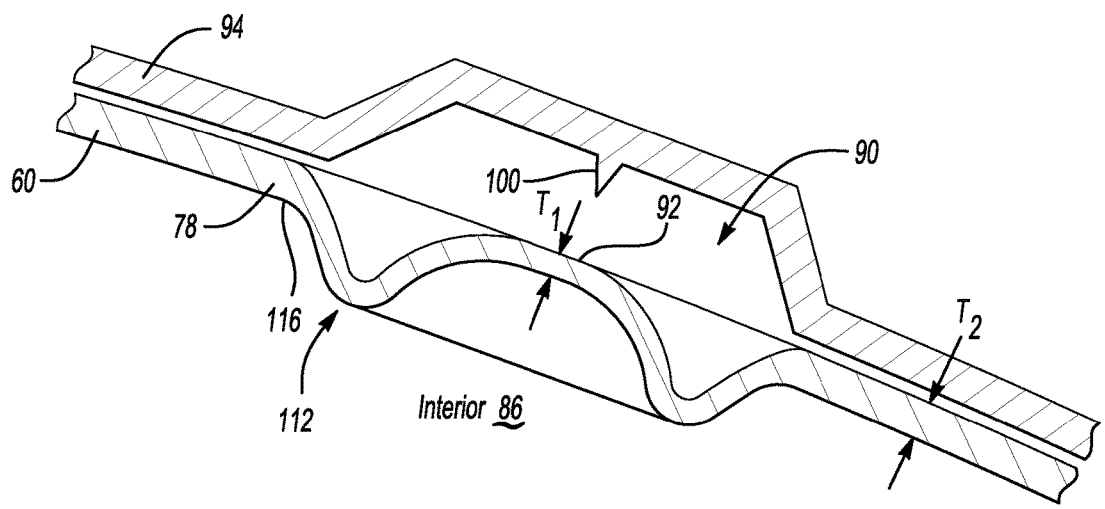
FIG. 5 illustrates a section view of a vent of the battery pack in a first, non-venting position and an area of the vehicle frame according to a first embodiment of this disclosure.
Figure 6:
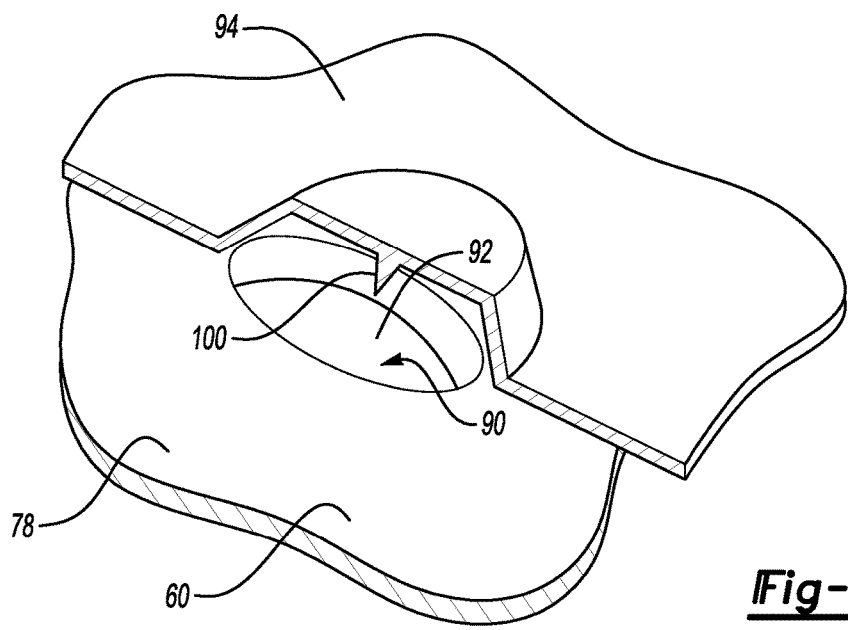
FIG. 6 illustrates a perspective view of the vent in the position of FIG. 5 and the area of the vehicle frame.

When in the first position of FIGS. 5 and 6, the vent 90 is spaced from the piercer 100. In response to an increase in pressure within the interior 86, the vent 90 moves outward away from the interior 86 toward the second position of FIGS. 7 and 8, and toward the piercer 100. Continued outward movement of the vent 90 against the piercer 100 creates an opening 108 in the vent 90. The opening 108 provides the passage for flow to move along paths P from the interior 86 through the opening 108 to the surrounding environment area. Flow through the opening 108 relieves the pressure within the interior 86.

In this example non-limiting embodiment, the vent 90 has the form of a bubble or dimple within the top enclosure wall 78. The vent 90 is recessed such that the outermost portion of the vent 90 does not extend proud of the surrounding surfaces of the top enclosure wall 78. The vent 90 is convex relative to the interior 86. In another example, the vent 90 could be concave relative to the interior 86. These example geometries for the vent 90 can facilitate movement from the first position to the second position in response to an increase in pressure within the interior 86.

The vent 90 has a thickness $T_1$ that is less than a thickness $T_2$ of the top enclosure wall 78 near the vent 90. The reduced thickness $T_1$ of the vent 90 can facilitate movement of the vent 90 from the first position to the second position in response to an increase in pressure within the interior 86. That is, because the thickness $T_1$ of the vent 90 is reduced relative to the thickness $T_2$, the vent 90 provides less resistance to pressure increases than the areas having the thickness $T_2$. Accordingly, the vent 90 is more likely to expand outward in response to an increase in pressure before any other areas of the top enclosure wall 78. The reduced thickness $T_1$ of the vent 90 can compensate for an increased stiffness of the vent 90 due to the section geometry of the vent 90. The vent 90 has a "W" shape that can behave like a living hinge such that the vent 90 flexes easily to move toward the second position.

Another feature of the vent 90 that facilitates movement from the first position to the second position is the crease 112 that is circumferentially distributed about a perimeter of the vent 90. The crease 112 is a portion of the vent 90 that protrudes into the interior 86 past an area 116 of the top enclosure wall 78 directly adjacent the vent 90. The crease 112 can result from the vent 90 being recessed within the top enclosure wall 78. The crease 112 provides excess material that can be straightened as the vent 90 moves to the second position. Although the crease 112 may increase section stiffness, the crease 112 permits the vent 90 to extend further outward when in the second position while not extending proud of the surrounding areas when in the first position.

Another example could eliminate the crease 112 and have the vent 90 in the form of a concave dome when in the first position that is forced into a convex dome when in the second positions. Such an embodiment could require less pressure to force movement to the second position, but would extend further into the interior 86.

Although the vent 90 in the section of FIG. 5 has a circular, rounded profile, other profiles are possible. For example, the vent 90, and the crease 112, could have a rectangular, or oval-shaped profile. Other profiles may be desired, for example, if the vent 90 should need to project further outward away from the interior 86 in response to an increase in pressure, or if tuning the vent 90 to move from the first position to the second position in response to a different pressure is desired.

In some examples, the vent 90 is used without the piercer 100. In such an example, the vent 90 ruptures when the pressure within the interior 86 increases to a point that expands the vent 90 to the point of rupture. The vent 90 could include a notched, or intentionally thinned, area to promote rupture at a particular location within the vent 90.

Although shown in the top enclosure wall 78 and used in connection with the piercer 100 on the vehicle frame 94, the vent 90 could be located elsewhere. For example, the vent 90 could be formed in the tray 64 and used in connection with a piercer incorporated into the strap 98.

Referring now to FIGS. 9-12 with continuing reference to FIGS. 2-4, another exemplary embodiment includes the vent 90a that can be formed within the top enclosure wall 78 or another enclosure wall of the enclosure 60.

The vent 90a includes an anchor 120. The anchor 120 can be formed together with the remaining portions of the vent 90a and top enclosure wall 78. The anchor 120 is a Christmas-tree fastener in this example. Other example anchors could include W-clips, tongue-and-groove anchors, and arrow-head fasteners. Yet another example could include an anchor with a "turkey leg" where a bulbous feature formed into the enclosure 14 can snap into a pocket fixed within the interior, or vice versa.

Still other example anchors could be provided by welding a portion of the vent 90a to another structure. For example, an area of the vent 90a could be ultrasonically welded to a structure within the interior 86 to provide the anchor.

When assembled, the anchor 120 is received within an anchoring receptacle 124 rigidly secured within the interior 86. The anchoring receptacle 124 could be mounted to one of the battery arrays 18, for example.

The vent 90a includes a score line 128 or notch, which is an area that is intentionally thinned relative to the adjacent areas. The anchor 120 is positioned near to the score line 128. The vent 90a additionally includes a crease 130 circumferentially distributed about a perimeter of the vent 90a. Like the crease 112 of the vent 90, the crease 130 permits more outboard movement of the vent 90a as the interior 86 increases. The score line 128 can extend partially about the vent 90a along the crease 130.

As pressure increases within the interior 86, the vent 90a begins to move outward. The anchor 120 resists movement of the vent 90a on one side of the score line 128, but the pressure continues to move areas of the vent 90a on the other side of the score line 128. Eventually, after pressure increases above a threshold level, the vent 90a ruptures along the score line 128 to provide an opening 108a within the vent 90a. Flow from the interior 86 can move along a path $P_A$ from the interior 86 through the opening 108a to the surrounding areas outside the interior 86.

Incorporating the anchor 120 means that less force is required to cause the rupture in the vent 90a. That is, if the anchor 120 were omitted, the vent 90a on both sides of the score line 128 would move together for some distance and greater pressure would be required to rupture the vent 90a.

Although the anchor 120 is utilized in this example, other examples may omit the anchor 120 and rely on the score line 128 to encourage rupture of the vent 90a in a desired area in response to an increase in pressure within the interior 86.

Features of the disclosed examples include providing a vent within an enclosure to, among other things, avoid rupturing a battery pack enclosure at a weld seam. The vent can be formed together with a portion of the enclosure to minimize build and assembly complexity. In some examples, the vent is formed when injection molding a portion of the enclosure.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly comprising:
   an enclosure wall of an enclosure that houses at least one battery cell; and
   a vent of the enclosure wall, the vent is configured to move from a first position to a second position in response to an increase in a pressure within an interior of the enclosure, the vent in the second position provides a passage through the enclosure wall to discharge battery vent byproducts from the interior, wherein the vent and the enclosure wall together provide a monolithic structure, and the passage is a rupture within the vent.

2. The battery assembly of claim 1, wherein an area of the enclosure wall directly adjacent the vent has a first thickness, and the vent has a second thickness that is less than the first thickness.

3. The battery assembly of claim 1, further comprising the enclosure having a lid and a tray, wherein the lid includes the enclosure wall with the vent.

4. The battery assembly of claim 1, wherein a portion of the vent protrudes into the interior past an area of the enclosure wall directly adjacent the vent when the vent is in the first position, and the portion is moved outward away from the interior when the vent is in the second position.

5. The battery assembly of claim 1, wherein the enclosure wall and the vent are integrally formed together.

6. The battery assembly of claim 1, further comprising a piercer outside the interior, wherein movement of the vent from the first position to the second position causes the piercer to rupture the vent to provide the passage.

7. The battery assembly of claim 6, wherein the vent includes a thermoplastic, and the piercer includes a metal or metal alloy.

8. The battery assembly of claim 1, wherein an outer periphery of the passage is provided entirely by the vent of the enclosure wall, and the vent and the enclosure wall are together a single monolithic structure.

9. The battery assembly of claim 1, wherein the enclosure wall is disposed circumferentially continuously about the passage when the vent is in the second position.

10. A battery assembly, comprising:
    an enclosure wall of an enclosure that houses at least one battery cell;
    a vent of the enclosure wall, the vent is configured to move from a first position to a second position in response to an increase in a pressure within an interior of the enclosure, the vent in the second position provides a passage to discharge battery vent byproducts from the interior; and
    an anchor securing a portion of the enclosure wall directly adjacent the vent to another structure separate from the enclosure wall, the anchor secures the portion when the vent is in the first position and when the vent is in the second position.

11. The battery assembly of claim 8, wherein the anchor is a molded-in anchor directed toward the interior.

12. The battery assembly of claim 8, wherein the anchor is configured to be engaged by a receiving feature housed within the interior.

13. The battery assembly of claim 8, further comprising a score line of the vent, wherein movement of the vent from the first position to the second position causes the vent to rupture at the score line to provide the passage.

14. A battery pack venting method, comprising:
moving a vent that is formed with an enclosure wall from a first position to a second position in response to an increase in a pressure within an interior of an enclosure having the enclosure wall, the vent in the second position provides a passage to discharge battery vent byproducts from the interior, the passage having a circumferentially continuous outer perimeter that is defined by the vent.

15. The battery pack venting method of claim 14, wherein the vent is formed as a single, monolithic structure together with the remaining portions of the enclosure wall, and the passage is a rupture within the vent.

16. The battery pack venting method of claim 14, wherein the moving comprises moving a portion of the vent extending into the interior outward away from the interior.

17. The battery pack venting method of claim 14, further comprising rupturing the vent with a piercer as the vent moves from the first position to the second position, the piercer located outside the interior.

18. The battery pack venting method of claim 14, further comprising rupturing the vent at a score line when moving the vent from the first position to the second position to provide the passage.

19. A battery pack venting method, comprising:
moving a vent that is formed with an enclosure wall from a first position to a second position in response to an increase in a pressure within an interior of an enclosure having the enclosure wall, the vent in the second position provides a passage to discharge battery vent byproducts from the interior; and anchoring a portion of the vent such that movement of the vent from the first position to the second position causes the vent to rupture.

20. The battery pack venting method of claim 19, wherein the anchoring comprising engaging an anchor of the enclosure wall with a receiving feature within the interior.

\* \* \* \* \*